3,843,426
PROPELLANT COMPOSITIONS WITH FERROCENE HOMO-POLYMER

Chester W. Huskins, Huntsville, and Dennis C. Van Landuyt, Auburn, Ala., assignors to the United States of America as represented by the Secretary of the Army
No Drawing. Original application June 15, 1971, Ser. No. 155,670. Divided and this application July 12, 1972, Ser. No. 270,797
Int. Cl. C06d 5/06
U.S. Cl. 149—19.2       4 Claims

ABSTRACT OF THE DISCLOSURE

The process for making homo-polymers of ferrocenylbutadiene by reacting ferrocenylbutadiene monomers in the presence of an azo initiator and a suitable solvent to form the homo-polymer. The homo-polymers are then used in propellant compositions to increase the burning rate and allow burning rate control by the percentage of the homo-polymer added and to also affect the mechanical properties of the propellant.

CROSS-REFERENCE TO RELATED APPLICATION

This application is a division of application Ser. No. 155,670, filed June 15, 1971 and is related to copending application Ser. No. 153,442, filed June 15, 1971, by Dennis C. Van Landuyt.

BACKGROUND OF THE INVENTION

Ferrocenes are usually used in liquid form as ballistic modifiers in solid propellant compositions and also serve as plasticizing agents. In the liquid stage, the ferrocene additives exhibit inherent disadvantages that are characteristic of liquid additives such as loss by evaporation, migration, etc., and consequently propellant systems suffer when stored for long periods of time. Therefore, a modified form of ferrocene additives is needed which form is not subject to loss by evaporation or migration when stored in a solid propellant composition.

Accordingly, it is an object of this invention to provide homo-polymers of ferrocenylbutadienes that can be used in propellant compositions.

Another object of this invention is to provide homo-polymers of ferrocenylbutadienes that can be incorporated into the binder structure of the propellant composition.

Still another object of this invention is to provide a novel process by which homo-polymers of ferrocenylbutadienes can be produced.

Still another object of this invention is to provide a novel process for making homo-polymers of ferrocenylbutadienes that uses free radical type polymerization initiators.

SUMMARY OF THE INVENTION

In accordance with this invention, homo-polymers of ferrocenylbutadienes are provided by polymerizing ferrocenylbutadiene in the presence of a solvent and an azo compound initiator. The homo-polymer is then incorporated into a propellant composition in an amount of about 0.01 to about 20 weight percent with other propellant ingredients such as a binder, a metal fuel, an oxidizer, crosslinking agent, and additives and processing aids as desired.

DETAIL DESCRIPTION OF THE INVENTION

This invention involves the preparation of homo-polymers of ferrocenylbutadienes such as those disclosed in the copending application of Dennis C. Van Landuyt, Ser. No. 153,442, filed June 15, 1971. Ferrocenylbutadienes prepared by other processes may also be used in this invention of homo-polymers and their use in propellant formulations. The homo-polymers according to this invention are used with conventional binders such as the carboxy terminated polybutadiene type, the hydroxy terminated polybutadiene type, polybutadiene acrylic acid, and other hydrocarbon binders. The carboxy terminated homo-polymer of ferrocenylbutadienes will be used with the carboxy terminated polybutadiene conventional binder and the hydroxy terminated polybutadiene polymer will be used with the hydroxy terminated polybutadiene propellant binder. By adjusting the amount of ferrocenylbutadiene homo-polymer used with the conventional propellant binder, the burning rate of the composition can be controlled. The homo-polymer also effects the mechanical properties of the propellant and can be considered for its efforts on the propellant characteristics.

The polymerization initiators to be used in forming the homo-polymers according to this invention include, $\alpha,\alpha'$-azo-bisisobutyronitrile (AIBN), 4,4'-azo-bis(4 cyanovaleric acid), 4,4'-azo-bis(4 cyanopentanol), hydroxybutyl-2,2'-azobisisobutyrate, and 2,2'-azo-bis(cyanopropanol). Other free radical forming initiators may also be used. The ratio of ferrocenylbutadiene to initiator may be .5/1 to about 15/1 and preferably from 1.5/1 to about 10/1. This ratio of ferrocenylbutadiene monomer to the initiator gives acceptable homo-polymers for this invention. The amount of initiator used influences molecular weight of the homo-polymer obtained. That is, the greater the amount of initiator the greater the molecular weight of the homo-polymer.

A polymerization procedure for producing homo-polymers according to this invention is as described: Into a pressure polymerization tube, place 5.0 grams of high purity ferrocenylbutadiene, a magnetic stirring bar, the required quantity of a selected initiator, and 30 ml. of redistilled reagent grade toluene. The reactants are then cooled to $-78°$ C. and degassed by evacuating the polymerization tube. This is followed by sealing. The polymerizations are conducted at about 65° to about 67° C. for a period of about 52–65 hours. After the induction period, the solutions are stripped of solvent by roto-evaporation. The recovered material is then subjected to analysis by infrared spectroscopy and by gel permeation chromatography. If the reaction product still contains monomer, isolation of the polymer product from unreacted monomer and initiator can be effected by elution chromatography using Merck silica gel and reagent grade toluene.

Synthesis of homo-polymer: Into a pressure polymerization tube was placed 5 grams of high purity 1-ferrocenyl-1,3-butadiene (m.p. 97–98° C.), a magnetic stirring bar, the required quantity of azobisisobutyronitrile (AIBN) initiator (m.p. 101–102° C.), and 30 ml. of redistilled reagent grade toluene. The reactants were then cooled to the $-78°$ C. and degassed by evacuating the polymerization tube. This was followed by sealing. Polymerizations were conducted at 67° C. for either 52 or 65 hours. After the induction period, the solutions were stripped of solvent by roto-evaporation. The recovered material was then subjected to analysis by infrared spectroscopy (Beckman IR–8) and by gel permeation chromotography (Waters Model 200).

Isolation of the homo-polymer product from reacted monomer and initiator was effected by elution chromatography using Merck silica gel and reagent grade toluene. The polymerization product was then analyzed for purity by gel permeation chromatography and characterized by elemental analysis, infrared and nuclear magnetic resonance spectroscopy. Nuclear magnetic resonance spectra were recorded with a Varian A–60 instrument using tetramethylsilane as internal reference and $CDCl_3$ as solvent.

Infrared spectra were obtained of a film of the dimer cast from a benzene solution onto NaCl plates. Other spectra were obtaine das $CCl_4$ solutions.

Table I below illustrates the polymerization reactions and the results:

TABLE I

[Polymerization trials]

| Exp. No. | M/I ratio | Time, hrs. | Recovered products, percent | | |
|---|---|---|---|---|---|
| | | | Monomer | Dimer | Trimer |
| 1 | 27.4/1 | 52 | >95 | | |
| 2 | 22.0/1 | 52 | >95 | | |
| 3 | 13.8/9 | 52 | >95 | Trace | |
| 4 | 11.0/1 | 52 | 95 | Trace | |
| 5 | 3.36/1 | 65 | 46 | 29 | 25 |
| 6 | 1.58/1 | 65 | 7 | 73 | 20 |

Characterization of dimer indicates that attack of isobutyronitrile radical on 1-ferrocenyl-1,3-butadiene occurs occurs at the 4-position to ultimately form the α-ferrocenyl radical via radical isomerization (reaction 1).

(1)
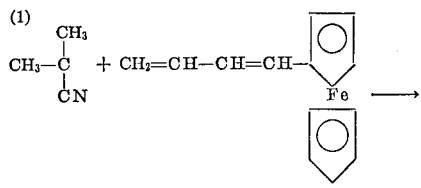

The α-ferrocenyl radical gains exceptional stability from both the ferrocenyl and allyl moietys and therefore, lacks sufficient energy to continue the propagation step of the polymerization reaction. The termination reaction apparently occurs by coupling of α-ferrocenyl radicals through the α-positions as shown in (reaction 2).

(2)
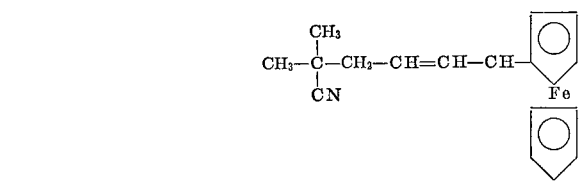

Synthesis of carboxy or hydroxy terminated homopolymers are produced in the same manner as the homopolymer above by substituting for the AIBN initiator a hydroxy or carboxy type azo initiator as listed supra.

The homo-polymers according to this invention may be used in propellent formulations as the only polymer involved as the binder when the homo-polymer is carboxy or hydroxy terminated, mixed and cocured with the appropriate hydroxy or carboxy terminated binder, or added as a burning rate catalyst when the homo-polymer is not hydroxy or carboxy terminated.

The propellant compositions according to this invention comprise a binder of about 0 to about 25 weight percent and preferably from about 10 to 25 weight percent, a metal fuel of about 5 to about 20 weight percent, an oxidizer of about 50 to about 75 weight percent and a ferrocenylbutadiene homo-polymer of an amount of about 0.01 to about 20 weight percent and preferably from about 1 to about 10 weight percent. Also, depending upon the particular binder employed, small amounts of conventional curing agents and conventional processing aids may be used as necessary to accomplish the desired mixing and curing of the propellant compositions.

Inorganic oxidizing salts which are useful in the solid propellant compositions of this invention are those oxygen contained salts which readily give up oxygen. These oxidizing salts include ammonium, alkali metal and alkaline earth metal salts of nictric perchloric and chloric acids, and mixtures thereof. Representative of the oxidizing salts referred to are ammonium perchlorate, ammonium nitrate, sodium nitrate, potassium perchlorate, potassium chlorate, lithium perchlorate, lithium chlorate, calcium nitrate, calcium chloride, barium perchlorate, strontium chlorate, and strontium perchlorate. Ammonium perchlorate is preferred since less smoke results from lower solids present in exhaust gases from a rocket motor wherein used. Lower smoke solids are required for military purposes of concealment. Also, ammonium perchlorate is preferred since it is available in large and well as small particle sizes.

Metal fuels useful in this invention include metal powders as additives in the propellant compositions according to the invention. These metal additives include in addition to the metal powder aluminum which is preferred, magnesium, titantium, zirconium, and boron. Alloys and mixtures of the aforesaid metals may also be employed.

Examples of propellant compositions according to this invention:

EXAMPLE I

Percent by weight

| | |
|---|---|
| Hydroxy terminated polybutadiene | 10 |
| Hydroxy terminated homo-polymer | 5 |
| Aluminum | 16 |
| Ammonium Perchlorate | 68 |
| Toluene Diisocyanate or Dimeryldiisocyanate | 1 |

EXAMPLE II

| | |
|---|---|
| Carboxy terminated polybutadiene | 12 |
| Ammonium Perchlorate | 68 |
| Aluminum | 16 |
| Carboxy terminated homo-polymer | 3 |
| MAPO*+ERLA** | 1 |

*Tris[1-(2-methyl)aziridinyl]phosphine oxide.
**Trifunctional epoxide produced by Shell Chemical Corporation.

EXAMPLE III

Percent by weight

| | |
|---|---|
| Carboxy terminated polybutadiene | 15 |
| Aluminum | 14 |
| Ammonium Perchlorate | 68 |
| Homo-Polymer initiated with AIBN | 3 |

From the above, it is believed to be obvious that one can vary the burning rate of the propellant composition by varying the ratio of the homo-polymer used in relation to the binder of the propellant composition. In accordance with this invention, a more stable burning rate propellant is provided through the use of homo-polymers of ferrocyenylbutadienes.

We claim:

1. A propellant composition comprising; a butadiene polymer binder of about 10 to about 25 weight percent, a metal fuel of about 5 to about 29 weight percent, an oxygen oxidizer of about 50 to about 75 weight percent, and a ferrocenylbutadiene dimer and trimer homopolymer of an amount of about 0.01 to about 20 weight percent.

2. The propellant composition of claim 1, wherein said binder is hydroxy terminated polybutadiene present in an amount of about 10 weight percent, wherein said dimer and trimer homo-polymer is hydroxy terminated and is present in an amount of about 5 weight percent, wherein said metal fuel is aluminum and is present in an amount of about 16 weight percent, wherein said oxygen oxidizer is ammonium perchlorate and is present in an amount of about 68 weight percent, and wherein said propellant composition further comprises a cross-linking agent selected from the group consisting of toluene diisocyanate and dimeryldiisocyanate and is present in an amount of about 1 weight percent.

3. The propellant composition of claim 1, wherein said binder is carboxy terminated polybutadiene and is present in an amount of about 12 weight percent, wherein said oxygen oxidizer is ammonium perchlorate and is present in an amount of about 68 weight percent, wherein said metal fuel is aluminum and is present in an amount of about 16 weight percent, wherein said dimer and trimer homo-polymer is carboxy terminated and is present in an amount of about 3 weight percent, and wherein said propellant composition further comprises curing agents of tris[1-(2-methyl)aziridinyl] phosphine oxide and a trifunctional epoxide present in an amount of about 1 weight percent.

4. The propellant composition of claim 1, wherein said binder is carboxy terminated polybutadiene present in an amount of about 15 weight percent, wherein said metal fuel is aluminum present in an amount of about 14 weight percent, wherein said oxygen oxidizer is ammonium perchlorate present in an amount of about 68 weight percent and wherein said dimer and trimer homo-polymer has been terminated with $\alpha,\alpha'$-azo-bisisobutyrnitrile initiator and is present in an amount of about 3 weight percent.

References Cited
UNITED STATES PATENTS

| | | | |
|---|---|---|---|
| 3,447,981 | 6/1969 | Sayles | 149—19 |
| 3,598,850 | 8/1971 | Dewey | 149—19 UX |
| 3,666,575 | 5/1972 | Fisher | 149—19 |

OTHER REFERENCES

Arimoto et al., J. Am. Chem. Soc., 77, 6295–7 (1955), (Sci. Lib.) QO 1 AS.

BENJAMIN R. PADGETT, Primary Examiner

E. A. MILLER, Assistant Examiner

U.S. Cl. X.R.

149—20, 44, 76, 19.9